H. Kime,
Sharpening Horseshoe Calks.
N° 84,553. Patented Dec. 1, 1868.
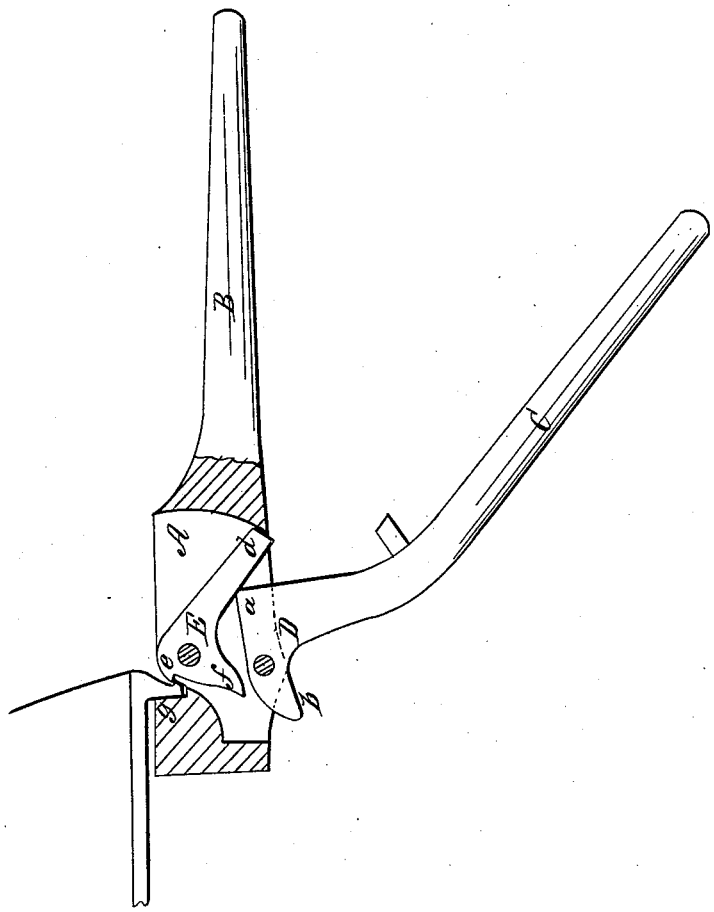
Witnesses:
Wm A. Morgan
G. C. Cotton
Inventor:
N Kime
per Munn & Co
Attorney

HENRY KIME, OF MARSHALLTOWN, IOWA.

Letters Patent No. 84,553, dated December 1, 1868.

IMPROVEMENT IN CALK-SHARPENERS.

The Schedule referred to in these Letters Patent and making part of the same.

*To all whom it may concern:*

Be it known that I, HENRY KIME, of Marshalltown, in the county of Marshall, and State of Iowa, have invented a new and useful Improvement in Instruments for Sharpening Calks; and I do hereby declare that the following is a full, clear, and exact description thereof, which will enable others skilled in the art to make and use the same, reference being had to the accompanying drawings, forming part of this specification, in which the drawing represents a sectional side view of my invention.

Similar letters of reference indicate like parts.

The object of this invention is to sharpen the calks of horse-shoes, while the latter are on the animal's feet.

It consists of a nib-plate pivoted within the recess of one of the handles of the instrument, and arranged in such co-relation with the other handle, that the heel of the latter will actuate the lever-extension of the nib-plate, and cause its nib-end to close upon the calk of the horse-shoe nipped between the said nib and the proximate edge of the recess, whereby the calk is cut off with a tapering cut, which leaves it with a sharpened or renewed edge.

In the drawings—

A is a recess, formed in the end of a metal handle, B.

C is a handle, the head D of which is pivoted in the recess A.

The head is formed with a heel, $a$, and toe $b$, for a purpose to be shown.

The nib-plate E has a lever-extension, $d$, a nib, $e$, and point $f$, as shown.

The calk, shown in red color, is nipped between the nib $e$ and the shouldered edge $g$, of metal, forming the end of the recess, as shown, and the nib $e$ cuts off the blunt point of the calk with a bevelled cut, thus leaving it with a sharp edge.

In bringing the handle C upon the handle B, in the operation of cutting, the heel $a$ acts upon the extension $d$, as shown, thus obtaining sufficient leverage to readily sever the calk.

When the handles are moved apart, the toe $b$ presses upon the point $f$, and thus opens the nib $e$ from contact with the part $g$, whereby the point of the calk may be inserted.

Having thus described my invention,

I claim as new, and desire to secure by Letters Patent—

An instrument for cutting off the points of horse-shoe calks, constructed substantially as shown and described, consisting of the nib-plate E, having the lever-extension $d$, and point $f$, in combination with the recessed handle B, and operated upon by the lever D, substantially as set forth.

HENRY KIME.

Witnesses:
THOMAS J. WILSON,
J. M. PARKER.